United States Patent
Takahashi et al.

(10) Patent No.: US 8,795,844 B2
(45) Date of Patent: Aug. 5, 2014

(54) ADHESIVE COMPOSITION, BONDING METHOD, LAMINATE AND TIRE

(75) Inventors: Yuwa Takahashi, Higashiyamato (JP); Daisuke Nohara, Higashiyamato (JP); Daisuke Nakagawa, Higashiyamato (JP)

(73) Assignee: Bridgestone Corporation, Tokyo (JP)

( * ) Notice: Subject to any disclaimer, the term of this patent is extended or adjusted under 35 U.S.C. 154(b) by 297 days.

(21) Appl. No.: 13/264,101

(22) PCT Filed: Apr. 14, 2010

(86) PCT No.: PCT/JP2010/002725
§ 371 (c)(1),
(2), (4) Date: Nov. 3, 2011

(87) PCT Pub. No.: WO2010/119685
PCT Pub. Date: Oct. 21, 2010

(65) Prior Publication Data
US 2012/0070678 A1    Mar. 22, 2012

(30) Foreign Application Priority Data
Apr. 15, 2009    (JP) .................................. 2009-098925

(51) Int. Cl.
| | | |
|---|---|---|
| *B32B 7/10* | (2006.01) | |
| *B32B 7/12* | (2006.01) | |
| *B32B 25/04* | (2006.01) | |
| *B32B 25/08* | (2006.01) | |
| *B60C 5/00* | (2006.01) | |
| *B60C 1/00* | (2006.01) | |
| *C09J 119/00* | (2006.01) | |

(52) U.S. Cl.
CPC ... *B32B 7/10* (2013.01); *B32B 7/12* (2013.01); *B32B 25/04* (2013.01); *B32B 25/08* (2013.01); *B60C 1/0008* (2013.01); *C09J 119/006* (2013.01)
USPC .......................................... 428/521; 156/510

(58) Field of Classification Search
None
See application file for complete search history.

(56) References Cited

FOREIGN PATENT DOCUMENTS

| | | |
|---|---|---|
| GB | 2-223 019 A | 3/1990 |
| JP | 63-039975 A | 2/1988 |
| JP | 63-234075 A | 9/1988 |
| JP | 2-003724 A | 1/1990 |
| JP | 7-053932 A | 2/1995 |
| JP | 9-316414 A | 12/1997 |
| JP | 11-035702 A | 2/1999 |
| JP | 2005-247954 A | 9/2005 |
| JP | 2006-224854 A | 8/2006 |
| JP | 2009-007408 A | 1/2009 |

OTHER PUBLICATIONS

Machine translation of JP 2005-247954A, Sep. 2005.*
English language translation of JP 2005-247954A, Sep. 2005.*
Extended European Search Report dated Oct. 10, 2012 issued in corresponding European Patent Application No. 10764272.0.
People's Republic of China Patent Office, Office Action issued on Jan. 7, 2013 in a counterpart Chinese Application No. 201080026605.8.
Russian Patent Office, Office Action issued on Dec. 27, 2012 in Russian Application No. 2011146129.
Korean Patent Office, Office Action issued on Dec. 28, 2012 in Korean Application No. 10-2011-7027014.
Office Action dated Jun. 24, 2013 from the People's Republic of China Patent Office in a counterpart Chinese Application No. 201080026605.8.

* cited by examiner

*Primary Examiner* — Ramsey Zacharia
(74) *Attorney, Agent, or Firm* — Sughrue Mion, PLLC

(57) ABSTRACT

An object of the present invention is to provide an adhesive composition which can bond a film to unvulcanized rubber strongly, and is flexible and rarely undergoes cracking under low temperature conditions; and a method for bonding a film to unvulcanized rubber using the adhesive composition. In addition, an object of the present invention is to provide a laminate formed by the bonding method; and a tire produced using the laminate. The adhesive composition of the present invention contains a polymer component which has a glass transition temperature or both a glass transition temperature and a melting point of 40° C. or lower, has a main chain having a random structure, has epoxy groups, and has sulfur-crosslinkable sites. The bonding method of the present invention is characterized by using the adhesive composition.

2 Claims, No Drawings

ADHESIVE COMPOSITION, BONDING METHOD, LAMINATE AND TIRE

CROSS REFERENCE TO RELATED APPLICATIONS

This application is a National Stage of International Application No. PCT/JP2010/002725, filed on Apr. 14, 2010, which claims priority from Japanese Patent Application No. 2009-098925, filed Apr. 15, 2009, the contents of all of which are incorporated herein by reference in their entirety.

TECHNICAL FIELD

The present invention generally relates to an adhesive composition which can bond a film to unvulcanized rubber strongly, and a method for bonding a film to unvulcanized rubber using the adhesive composition. The present invention also relates to a laminate formed using the bonding method and a tire produced using the laminate.

RELATED ART

Conventionally, an inner liner formed by laminating a resin film and a rubber elastic body (adjacent rubber) has been known as an inner liner for pneumatic tires. Additionally, known as the resin film is such a film that is made of a thermoplastic resin and a thermoplastic elastomer. This film, however, offers insufficient adhesiveness to the adjacent rubber.

On the other hand, a technology is known to bond a film to adjacent rubber by applying or otherwise attaching an adhesive to the film. To date, commercially available adhesives, such as METALOC R-46 (manufactured by Toyo Chemical Laboratories) or Chemlok 6250 (manufactured by Lord Corp.), have been used as an adhesive to bond the film to the adjacent rubber. However, such commercial adhesives may increase environmental burdens since they contain lead, halogen, and so on. In addition, if chlorosulfonated polystyrene (CSM) is contained in an adhesive as a polymer component, it is necessary to add a tacky rubber component, such as natural rubber, butyl rubber, brominated butyl rubber, chlorinated butyl rubber, isoprene, butadiene rubber or styrene butadiene rubber, for obtaining improved tack as the adhesive. Such a rubber component can be incompatible with CSM due to the large difference in SP value. This may result in inadequate adhesiveness between the film and the adjacent rubber.

In addition, if an unmodified diene-based elastomer is used to bond the film to the adjacent rubber, the unmodified diene-based elastomer is co-cross-linked with and bonded to the adjacent rubber, but neither react with nor adhere to the film. Accordingly, an unmodified diene-based elastomer alone will be inadequate to ensure a sufficient adhesive function.

Further, as a laminate (inner liner) being formed by means of direct bonding between a film and adjacent rubber, such a laminate is disclosed that is formed by bonding, through vulcanization, a film in which partially vulcanized rubber is dispersed in a film matrix containing nylon to adjacent rubber in which a polymer component having epoxy groups is dispersed (see JP-A-2006-224854: Patent Document 1). However, since the epoxy-SBS and ethylene/GMA/vinyl acetate copolymer have a high glass transition temperature (Tg) and melting point (Tm) as shown in the examples of Patent Document 1, the laminate may undergo cracking under winter driving conditions when used as a tire member. Moreover, the film in which partially vulcanized rubber is dispersed and the adjacent rubber in which a polymer component having epoxy groups is dispersed need to be prepared prior to bonding. This limits the degree of freedom in selecting material during production of the laminate, while making production work cumbersome.

RELATED ART DOCUMENT

Patent Document

Patent Document 1: JP-A-2006-224854

DISCLOSURE OF THE INVENTION

Problems to be Solved by the Invention

Therefore, an object of the present invention is to provide an adhesive composition which can bond a film to unvulcanized rubber strongly, and which is flexible and rarely undergoes cracking under low temperature conditions such as winter season; and a method for bonding a film to unvulcanized rubber using the adhesive composition. In addition, another object of the present invention is to provide a laminate formed using the bonding method; and a tire produced using the laminate.

Means for Solving the Problem

The inventors have made various studies in order to achieve the above-mentioned objects, and as a result, the following findings have been obtained: a film and unvulcanized rubber can be bonded together strongly with ease, but without limiting the degree of freedom in selecting material, by disposing, before the unvulcanized rubber is vulcanized, an adhesive composition which has a predetermined property, has sulfur-crosslinkable sites and contains a polymer component having epoxy groups as cement or as a sheet between the film and the unvulcanized rubber. Based on the above, the inventors make the invention. The inventors also found that an adhesive composition can be obtained that is flexible and rarely undergoes cracking even under low temperature conditions by using a polymer which has a glass transition temperature or both a glass transition temperature and a melting point of 40° C. or lower, and has a main chain having a random structure. Based on this, the inventors make the invention.

That is, the adhesive composition of the present invention contains a polymer component which has a glass transition temperature or both a glass transition temperature and a melting point of 40° C. or lower, has a main chain having a random structure, has epoxy groups and has sulfur-crosslinkable sites. Besides, if the polymer component of the adhesive composition of the present invention has both a glass transition temperature and a melting point, then both the glass transition temperature and the melting point need to be equal to or less than 40° C.; or if the polymer component does not have a melting point, then only the glass transition temperature needs to be equal to or less than 40° C. Additionally, as used herein, the term "random structure" means an irregular structure, e.g., a structure being formed by means of random anionic polymerization. Moreover, an example of such a polymer with a main chain having a random structure includes BR01 (manufactured by JSR), or the like.

In addition, it is preferable that the adhesive composition of the present invention further comprises a cross-linker or both a cross-linker and a cross-linking accelerator.

Further, in the adhesive composition of the present invention, the polymer component preferably contains a high molecular weight polymer which has a weight average molecular weight of 150000-2000000.

Still further, in the adhesive composition of the present invention, the polymer component preferably contains a low molecular weight polymer which has a weight average molecular weight of 2000-100000.

The method for bonding a film to unvulcanized rubber according to the present invention comprises: disposing the adhesive composition between the film and the unvulcanized rubber; and then vulcanizing the unvulcanized rubber to bond the film to the unvulcanized rubber.

In a preferred example of the method for bonding a film to unvulcanized rubber of the present invention, the film contains any of ethylene-vinyl alcohol based copolymer, urethane based polymer, olefin based polymer or diene based polymer.

In addition, in another preferred example of the method for bonding a film to unvulcanized rubber of the present invention, cement having the adhesive composition dissolved in a good solvent is applied to a film or unvulcanized rubber to dispose the adhesive composition between the film and the unvulcanized rubber.

In another preferred example of the method for bonding a film to unvulcanized rubber of the present invention, the adhesive composition is processed into sheet form before being disposed between the film and the unvulcanized rubber.

A laminate of the present invention is characterized in that it is formed by the above-described method for bonding a film to unvulcanized rubber.

A tire of the present invention is characterized in that it is produced using the above-described laminate.

Effect of the Invention

The present invention may provide an adhesive composition which can bond a film to unvulcanized rubber strongly, and which is flexible and rarely undergoes cracking even under low temperature conditions such as winter season; and a method for bonding a film to unvulcanized rubber using the adhesive composition. The present invention may also provide a laminate formed using the bonding method; and a tire using the laminate.

BEST MODE FOR CARRYING OUT THE INVENTION

The adhesive composition of the present invention comprises: a polymer component which has a glass transition temperature of 40° C. or lower if it does not have a melting point, or both a glass transition temperature and a melting point of 40° C. or lower if it has a melting point, has a main chain having a random structure, has epoxy groups and has sulfur-crosslinkable sites; and optionally a cross-linker or both a cross-linker and a cross-linking accelerator. When the adhesive composition having such properties is disposed between the film and the unvulcanized rubber, and when the unvulcanized rubber in the unvulcanized laminate which includes the film, adhesive composition and unvulcanized rubber is vulcanized, epoxy groups present in the polymer component reacts with and is bound to a functional group on the surface of the film, while the unvulcanized rubber and the sulfur-crosslinkable sites in the polymer component being bound together by a sulfur bridge. The film is then bonded to the vulcanized rubber (such as adjacent rubber) strongly via the adhesive composition. In addition, since the adhesive composition does not need to contain lead or halogen, the use of the adhesive composition would not result in additional environmental pollution. Further, use of the adhesive composition of the present invention enables strong bonding between a film having a functional group on its surface and sulfur-crosslinkable unvulcanized rubber (unvulcanized adjacent rubber) without preparing material in advance. Accordingly, in the event the adhesive composition of the present invention is used to bond a film to unvulcanized rubber, it is possible to bond the film to the unvulcanized rubber easily and thereby fabricate an inner liner and the like. This offers a high degree of freedom in material selection. In this case, the following may be used as a cross-linker optionally compounded into the adhesive composition: sulfur, zinc oxide, p,p'-dibenzoyl quinine dioxime, alkyl phenol formaldehyde, brominated alkyl phenol formaldehyde, and so on. In addition, as a cross-linking accelerator, the following may be used: N-cyclohexyl-2-benzothiazolylsulfenamide, N,N'-dicyclohexyl-2-benzothiazolylsulfenamide, 1,3-diphenylguanidine, di-o-tolylguanidine, mercaptobenzothiazole (MBT), tetramethylthiuram disulfide (TMTD), and so on.

Preferably, the polymer component used for the adhesive composition of the present invention is modified with a compound having epoxy groups as a functional group. The modification of the polymer component in the adhesive composition with the compound having epoxy groups introduces a functional group (epoxy group) which reacts with a hydroxyl group into the polymer component. Thus, if the film has a hydroxyl group on its surface, the hydroxyl group of the film reacts with the functional group of the polymer component. This provides particularly favorable adhesiveness between the film and the adjacent rubber via the adhesive composition.

It is preferable that the polymer component used for the adhesive composition of the present invention further comprises a high molecular weight polymer having a weight average molecular weight of 150000-2000000. The reason is as follows: if the polymer component used for the adhesive composition contains a high molecular weight polymer, then the stiffness of the adhesive composition layer (adhesion layer) comprising the adhesive composition will be improved at the time the film and the adjacent rubber are bonded together via the adhesive composition, which contributes to enhanced durability of the adhesive composition layer. It is also preferable that the polymer component used for the adhesive composition of the present invention contains a low molecular weight polymer having a weight average molecular weight of 2000-100000. The reason is as follows: if the polymer component used for the adhesive composition contains a low molecular weight polymer, then the tack of the adhesive composition layer comprising the adhesive composition will be increased at the time the film and the adjacent rubber are bonded together via the adhesive composition, which contributes to, for example, improved workability during the production of tires. Meanwhile, the low molecular weight polymer having a weight average molecular weight of less than 2000 may provide inadequate polymer entanglement and therefore reduce the tack (i.e., it may lower the workability during the production of tires); whereas the low molecular weight polymer having a weight average molecular weight of more than 100000 may reinforce the polymer entanglement and therefore reduce the adherence. Incidentally, the weight average molecular weight can be measured by a known method, such as gel permeation chromatography (GPC).

The adhesive composition of the present invention may be compounded with not only the above-described polymer component, cross-linker and cross-linking accelerator, but also other compounding agents selected appropriately from those usually employed in the rubber industry, including resin component, carbon black, oil such as process oil, antioxidant, softener, zinc oxide or stearic acid, without departing from the objects of the invention. Meanwhile, commercial products may be preferably used as the compounding agents.

The method for bonding a film to unvulcanized rubber using the adhesive composition of the present invention comprises: disposing the adhesive composition of the present invention between the film and the unvulcanized rubber; and then vulcanizing the unvulcanized rubber to bond the film to the unvulcanized rubber and thereby forming a laminate. More specifically, according to the bonding method of the present invention, by applying heat and/or pressure to an unvulcanized laminate which is formed by laminating the film, adhesive composition and unvulcanized rubber and vulcanizing the unvulcanized rubber, epoxy groups present in the polymer component of the adhesive composition is bonded to a functional group on the surface of the film by reaction, while the unvulcanized rubber and the sulfur-crosslinkable sites in the polymer component of the adhesive composition are bonded together through a sulfur bridge. The film is then bonded to the vulcanized rubber strongly via the adhesive composition. In this case, commonly used vulcanization conditions may be used, including, but not limited to, at a temperature of 120° C. or higher, preferably at 125-200° C., more preferably at 130-180° C., and preferably at a pressure of 0.2-50 MPa.

In addition, in the bonding method of the present invention, if a film includes a resin, then it is preferably irradiated with energy line to induce crosslinking in the film before the adhesive composition is disposed between the unvulcanized rubber and the film. If the film is not crosslinked by energy line, then the film would deform so much that the uniformity of the layer cannot be maintained at the time of subsequent bonding (when the unvulcanized rubber of the unvulcanized laminate is vulcanized to bond the film, the adhesive composition and the unvulcanized rubber). This could result in the inability of the laminate obtained by bonding the film to the unvulcanized rubber via the adhesive composition to accomplish a desired function. As used herein, energy line includes ionizing radiation, such as ultraviolet ray, electron beam, X-ray, alpha ray or gamma ray. Among these, electron beam is particularly preferable. Besides, if the film is crosslinked by electron beam, then the film is preferably made of a resin of electron beam crosslinking type. Specifically, the resin includes, for example, olefin-based, diene-based, ethylene-vinyl alcohol-based, urethane-based and amide-based polymers. In such electron beam irradiation, the electron beam is preferably irradiated at 2.5-60 Mrad, more preferably 5-50 Mrad. With an electron beam dose of below 2.5 Mrad, it becomes harder to advance crosslinking, while above 60 Mrad, the crosslinked film is more prone to degradation.

In the method for bonding a film to unvulcanized rubber using the adhesive composition of the present invention, the adhesive composition may preferably be disposed between the film and the unvulcanized rubber by:

(1) providing unvulcanized rubber or a film on the side of the adhesive composition layer of the laminate, which laminate includes either a film/adhesive composition layer or an unvulcanized rubber/adhesive composition layer, each layer being obtained by applying the cement having the adhesive composition dissolved in a good solvent to a film or unvulcanized rubber and drying the cement, respectively (cement application method);

(2) providing unvulcanized rubber on the side of the adhesive composition layer (in sheet form) of the laminate of the film/adhesive composition layer (in sheet form), which laminate is obtained by applying a solution (such as cement) in which the adhesive composition is dissolved to a mold release base with mold releasability, such as a PET film, and drying the solution to establish a laminate including the PET film and the adhesive composition layer, then pressing the film against the adhesive composition layer and subsequently peeling off the PET film (transfer method);

(3) providing unvulcanized rubber on the side of the adhesive composition layer (in sheet form) of the laminate of the film/adhesive composition layer (in sheet form), which laminate is obtained by processing kneaded rubber comprising the adhesive composition into sheet form by a sheeting roll and pressing the film against the sheet (sheeting method), and so on.

When the above-described cement method is used in the method for bonding a film to unvulcanized rubber using the adhesive composition of the present invention, the adhesive composition is first dissolved in a good solvent to prepare cement. As used herein, good solvent means a solvent which has a Hildebrand solubility parameter (d value) of 14-26 $MPa^{1/2}$. Examples of the good solvent may include, for example, toluene (d value: 18.2), xylene (d value: 18), n-hexane (d value: 14.9), cyclohexane (d value: 16.8), chloroform (d value: 19), methyl ketone and THF. Each of these solvents may be used alone or in combination with one or more other solvents. The solid content concentration of the prepared cement is selected appropriately considering coatability and handling properties. The solid content concentration is usually 5-50% by mass, preferably 10-30% by mass.

When the adhesive composition is disposed using the transfer method, the above-described cement is first coated over a mold release base. As used herein, any material that enables mold release of the adhesive composition layer may be used as the mold release base material without limitation. However, a mold releasing polyethylene terephthalate (PET) film or mold releasing paper is preferable in terms of easy mold release. As used herein, the mold releasing polyethylene terephthalate (PET) film or mold releasing paper indicates the PET film and paper base subjecting the mold-release treatment. Specifically, this is a base which is formed by coating mold releasing agents, such as silicone-based, fluorine-based, long chain alkyl-based, paraffin-based or olefin-based mold releasing agents, and laminating mold releasing layers.

Then, in the transfer method, the cement coated over the mold releasing base is dried to obtain a sheet comprising the adhesive composition layer. In this case, the temperature at which the cement is dried is selected appropriately depending on the solvent used to prepare the cement. The temperature is usually around 50-120° C., preferably 60-100° C. The adhesive composition layer preferably has a thickness of 1-100 μm after coating/drying, more preferably 1-50 μm. The adhesive composition layer having a thickness within this range may provide better adhesiveness. In the transfer method, the sheet comprising the adhesive composition layer is then transferred to the film. In this way, the sheet comprising the adhesive composition layer is produced and transferred to the film in advance. This eliminates the need to handle a solvent during the tire molding process when the laminate fabricated by the bonding method of the present invention is to be used as an inner liner.

In the adhesive composition of the present invention, the polymer component included in the adhesive composition has, for example, a main chain having a random structure formed by random anionic polymerization. Preferably, the polymer component does not include a block or segment having a glass transition temperature (Tg) or both a melting point (Tm) and a glass transition temperature (Tg) of higher than 40° C. By way of example, if the adhesive composition contains a block or segment of styrene, it becomes less flexible because styrene is in a glass state and exhibits very hard behavior around room temperature. However, the flexibility of the adhesive composition can be maintained if the adhesive composition has a random structure, irrespective of inclusion of styrene or the like. In this case, the content of the polymer component in the adhesive composition is preferably 1-99% by mass. In addition, the main chain of the polymer component preferably includes a double bond (diene content) as sulfur-crosslinkable sites. As used herein, examples of the main chain include butadiene skeleton, isoprene skeleton, styrene-butadiene skeleton, styrene-isoprene skeleton, or partially hydrogenated products thereof. Besides, Tg and Tm can be measured by, e.g., differential scanning calorimetry (DSC).

The adhesive composition of the present invention allows formation of a laminate in which a film and unvulcanized rubber are bonded together strongly. Such a laminate may be used as, for example, an inner liner for tires without limitation.

EXAMPLE

The present invention will be described more specifically below with reference to examples. It should be noted, however, that the present invention is not limited by these examples and various modifications may be made thereto as necessary without departing from the scope of the invention.

(Method for Preparing a Modified Ethylene-vinyl Alcohol (EVOH) Copolymer)

Here, 2 parts by mass of an ethylene-vinyl alcohol copolymer (ethylene content=44 mol %, saponification degree=99.9%, MFR under 190° C., 2160 g load: 5.5 g/10 min) and 8 parts by mass of N-methyl-2-pyrrolidone were placed into a pressurized reaction tank, then heated at 120° C. for two hours under stirring, after which the ethylene-vinyl alcohol copolymer is completely dissolved. The resultant was added with 0.4 parts by mass of epoxy propane as an epoxy compound, then heated at 160° C. for four hours. After completion of heating, the resultant was precipitated in 100 parts by mass of distilled water, then N-methyl-2-pyrrolidone and unreacted epoxy propane were thoroughly rinsed with a large amount of distilled water. As a result, a modified ethylene-vinyl alcohol copolymer was obtained.

(Fabrication of Monolayer Film)

In Comparative Examples 1-3 and Examples 1-24, 29, 30, using a twin-screw extruder (manufactured by Toyo Seiki Seisaku-sho, Ltd.), a resin film was formed as indicated in Tables 3-6, respectively, under the following extrusion conditions to fabricate a monolayer film having a thickness of 20 μm:

Screw: 20 mmΦ, full flight
Cylinder and die temperature setting:
C1/C2/C3/die=200/200/200/200 (° C.)

(Fabrication of Three-Layer Film)

In Examples 26-28, by using the modified EVOH copolymer obtained and thermoplastic polyurethane (TPU) (KURAMILON 3190, manufactured by Kuraray Co., Ltd.), a three-layer film (thermoplastic polyurethane layer/modified EVOH layer/thermoplastic polyurethane layer) was fabricated by a two-type-three-layer coextruder under the coextrusion molding conditions as described below. Each of the modified EVOH layer and TPU layer has a thickness of 20 μm. Besides, in Example 25, the three-layer film was fabricated in the same way as Examples 26-28, except that modified PE (ADTEX, manufactured by Japan Polyethylene Corporation) was used instead of thermoplastic polyurethane.

The coextrusion molding conditions were as follows:
Layer structure:
thermoplastic polyurethane/modified EVOH/thermoplastic polyurethane (Thickness (μm): 20/20/20)
Extrusion temperature of each resin:
C1/C2/C3/die=170/170/200/200° C.
Specifications of extruder for each resin:
Thermoplastic polyurethane:
25 mmΦ Extruder P25-18AC
(manufactured by Osaka Seiki Kosaku K.K.)
Modified EVOH:
20 mmΦ Extruder (Laboratory-type) ME Model CO-EXT
(manufactured by Toyo Seiki Seisaku-sho, Ltd.)
T-die specifications:
500 mm wide, for two-type-three-layer extrusion
(manufactured by PLABOR Co., Ltd.)
Cooling roll temperature: 50° C.
Drawing speed: 4 m/min (Method for Preparing Adjacent Rubber)

Used for adjacent rubber (butyl rubber-based) was such a rubber composition that was prepared by compounding the following agents with respect to 30 parts by mass of natural rubber and 70 parts by mass of brominated butyl rubber (Bromobutyl 2244, manufactured by JSR): 60 parts by mass GPF carbon black (#55 manufactured by Asahi Carbon Co., Ltd.); 7 parts by mass SUNPAR 2280 (manufactured by Japan Sun Oil Co., Ltd.); 1 part by mass stearic acid (manufactured by ADEKA Corp.); 1.3 parts by mass Nocceler DM (manufactured by Ouchishinko Chemical Industrial Co., Ltd.); 3 parts by mass zinc oxide (manufactured by Hakusui Tech Co., Ltd.); and 0.5 parts by mass sulfur (manufactured by Karuizawa Seirenjo Co. Ltd.).

Used for adjacent rubber (diene-based) was such a rubber composition that was prepared by compounding the following agents with respect to 100 parts by mass of natural rubber: 60 parts by mass GPF carbon black (#55 manufactured by Asahi Carbon Co., Ltd.); 7 parts by mass SUNPAR 2280 (manufactured by Japan Sun Oil Co., Ltd.); 1 part by mass stearic acid (manufactured by ADEKA Corp.); 1.3 parts by mass Nocceler DM (manufactured by Ouchishinko Chemical Industrial Co., Ltd.); 3 parts by mass zinc oxide (manufactured by Hakusui Tech Co., Ltd.); and 0.5 parts by mass sulfur (manufactured by Karuizawa Seirenjo Co. Ltd.).

Besides, each adjacent rubber has a thickness of 1 mm.

Bonding Method by Cement Application Method (Cement App. Method); COMPARATIVE EXAMPLES 1-3 AND EXAMPLES 1-21, 24-30

Using an electron beam irradiating apparatus "Curetron EBC200-100 for Production" (manufactured by Nisshin High-Voltage Co. Ltd.), the film as indicated in Tables 3-6 was irradiated with electron beam under the condition—acceleration voltage=200 kV, irradiation energy=30 Mrad—to perform crosslinking treatment. Then, 100 parts by mass of the rubber component shown in Tables 1-2 was kneaded with the other components in the usual manner, added into 1000 parts by mass of the organic solvent (d value: 18.2 $MPa^{1/2}$) as indicated in Tables 3-6, and then dissolved or dispersed to prepare an adhesive composition (cement). Using "SA-203 bar coater No. 55" (manufactured by TESTER SANGYO CO., LTD.), the adhesive composition was coated over the film so that the layer thickness of the adhesive composition becomes 20 μm, and then dried at 100° C. for two minutes to form an adhesive composition layer. Then, adjacent rubber (unvulcanized rubber) was laminated thereon. Subsequently, the unvulcanized rubber was vulcanized at 160° C. for 15 minutes. As a result, the film was bonded to the adjacent rubber. Besides, polymers having epoxy groups are highlighted by underline in Tables 3-6.

Bonding Method by Transfer Method; EXAMPLE 22

Using an electron beam irradiating apparatus "Curetron EBC200-100 for Production" (manufactured by Nisshin High-Voltage Co. Ltd.), the film comprising the modified EVOH synthesized by the above-described method was irradiated with electron beam under the condition—acceleration voltage=200 kV, irradiation energy=30 Mrad—to perform crosslinking treatment. Then, 100 parts by mass of the rubber component shown in Table 1 was kneaded with the other components in the usual manner, added into 1000 parts by mass of the organic solvent, toluene (d value: 18.2 $MPa^{1/2}$), and then dissolved or dispersed to prepare an adhesive composition. Using "SA-203 bar coater No. 55" (manufactured by TESTER SANGYO CO., LTD.), coating liquid comprising the adhesive composition was coated on one side of a mold releasing PET film ("MRF", manufactured by Mitsubishi Chemical Polyester Film Co., Ltd.) so that the layer thickness of the adhesive composition becomes 20 μm, and then dried at 100° C. for two minutes to form an adhesive composition layer. Then, the adhesive composition layer was transferred and laminated to the film. Then, the mold releasing PET film was peeled off to obtain a film/adhesive composition layer (in the form of a sheet having a thickness of 20 μm). Then, adjacent rubber (unvulcanized rubber) was laminated thereon. Subsequently, the unvulcanized rubber was vulcanized at 160° C. for 15 minutes. As a result, the film was bonded to the adjacent rubber.

Bonding Method by Sheeting Method; EXAMPLE 23

Using an electron beam irradiating apparatus "Curetron EBC200-100 for Production" (manufactured by Nisshin High-Voltage Co. Ltd.), the film comprising the modified EVOH synthesized by the above-described method was irradiated with electron beam under the condition—acceleration voltage=200 kV, irradiation energy=30 Mrad—to perform crosslinking treatment. Then, the kneaded rubber of the adhesive composition containing E-NR was processed into a 0.5 mm sheet by a sheeting roll, which sheet in turn was pressed against the film to obtain a film/adhesive composition layer. Then, adjacent rubber (unvulcanized rubber) was laminated thereon. Subsequently, the unvulcanized rubber was vulcanized at 165° C. for 15 minutes. As a result, the film was bonded to the adjacent rubber.

The adhesive composition was prepared according to the compounding ratio shown in Tables 1 and 2, while the film, adhesive composition and adjacent rubber described in Tables 3-6 were bonded together in a laminated manner using the methods as illustrated in Tables 3-6. As a result, a laminate including the film, adhesive composition and adjacent rubber was produced.

Each laminate was subjected to T-type peeling test according to JIS K6854 to measure its peeling resistance (peeling strength). The obtained measurements are expressed in index form with the peeling resistance of Comparative Example 1 as 1. The results are shown in Tables 3-6. Further, the tack of each laminate was measured by the following method. The results are shown in Tables 3-6. Further, passenger car tires (size: 195 65R15) were fabricated using respective laminates as inner liners. These tires were mounted on respective rims while being filled with inner pressure of 100 kPa, and then subjected to drum running test over 10,000 km. Thereafter, the tires were visually observed to investigate the condition of each adhesive composition layer (adhesion layer). The results are shown in Tables 3-6.

(Tack Evaluation)

Probe tack tests were conducted according to JIS Z0237 for tack measurement, and the results are expressed in index form with the tack of Comparative Example 1 as 1.

TABLE 1

| Type of Adhesive Composition | | E-NR50/ NR | E-NR25/ NR | E-NR50 | E-NR25 | BR/ Epoxy BR | E-NR50/ Br-IIR | E-NR50/ IR | IR/LIR |
|---|---|---|---|---|---|---|---|---|---|
| NR | parts | 50 | 50 | | | | | | |
| E-NR50 *1 | by | 50 | | 100 | | | 50 | 50 | |
| E-NR25 *2 | mass | | 50 | | 100 | | | | |
| BR *13 | | | | | | 100 | | | |
| SBR *14 | | | | | | | | | |
| Epoxy BR *3 | | | | | | 30 | 50 | | |
| Br-IIR *4 | | | | | | | | | |
| IR *5 | | | | | | | | 50 | 100 |
| LIR-403 | | | | | | | | | 30 |
| Carbon black *6 | | 30 | 30 | 30 | 30 | 30 | 30 | 30 | 30 |
| Resin *7 | | 10 | 10 | 10 | 10 | 10 | 10 | 10 | 10 |
| ZnO | | 3 | 3 | 3 | 3 | 3 | 3 | 3 | 3 |
| Stearic acid | | 1 | 1 | 1 | 1 | 1 | 1 | 1 | 1 |
| Sulfur | | 1 | 1 | 1 | 1 | 1 | 1 | 1 | 1 |
| 6C *8 | | 1 | 1 | 1 | 1 | 1 | 1 | 1 | 1 |
| CZ *9 | | 1.5 | 1.5 | 1.5 | 1.5 | 1.5 | 1.5 | 1.5 | 1.5 |

TABLE 2

| Type of Adhesive Composition | | NR based | E-SBR based | E-GMA-LA based |
|---|---|---|---|---|
| NR | parts by | 100 | | |
| SBR *1 | mass | | 75 | 75 |
| Epoxy polymer 1 *10 | | | 25 | |
| Epoxy polymer 2 *11 | | | | 25 |
| Carbon black *6 | | 30 | 30 | 30 |
| Resin *7 | | 10 | 10 | 10 |
| ZnO | | 3 | 3 | 3 |
| Stearic acid | | 1 | 1 | 1 |
| Sulfur | | 1 | 1 | 1 |
| 6C *8 | | 1 | 1 | 1 |
| CZ *9 | | 1.5 | 1.5 | 1.5 |

TABLE 3

|  |  | Comparative Example 1 | Comparative Example 2 | Comparative Example 3 | Example 1 | Example 2 | Example 3 | Example 4 | Example 5 |
|---|---|---|---|---|---|---|---|---|---|
| Film |  | modified EVOH | modified EVOH | modified EVOH | modified EVOH | modified EVOH | modified EVOH | modified EVOH | modified EVOH |
| Type of Adhesive Composition |  | E-SBS based | E-GMA-LA based | NR based | E-NR50/NR | E-NR25/NR | E-NR50 | E-NR25 based | BR/Epoxy BR |
| Structure of polymer in adhesive |  | block | random | random | random | random | random | random | random |
| Weight average molecular weight of polymer |  | — | — | 1300000 | 700000/1300000 | 1000000/1300000 | 700000 | 1000000 | 1400000/5900 (number ave.) |
| Tg of modified polymer |  | 100° C. | −28° C. | −70° C. | −24° C. | −47° C. | −24° C. | −47° C. | −60° C. |
| Tm of modified polymer |  | — | 95° C. | — | — | — | — | — | — |
| Solution to dissolve adhesive |  |  |  | cyclohexane | cyclohexane | cyclohexane | cyclohexane | cyclohexane | cyclohexane |
| Preparation method |  | cement app. method | cement app. method | cement app. method | cement app. method | cement app. method | cement app. method | cement app. method | cement app. method |
| Adjacent rubber |  | diene based | diene based | butyl rubber based | butyl rubber based | butyl rubber based | butyl rubber based | butyl rubber based | butyl rubber based |
| Peeling resistance | Index | 1 | 1 | 0.01 | 1.1 | 0.9 | 0.8 | 1.1 | 1 |
| Tack |  | 1 | 1 | 10 | 10 | 7 | 20 | 9 | 21 |
| Observations on adhesion layer after drum running |  | crack found in adhesion layer | crack found in adhesion layer | — | no crack in adhesion layer | no crack in adhesion layer | no crack in adhesion layer | no crack in adhesion layer | no crack in adhesion layer |

TABLE 4

|  |  | Example 6 | Example 7 | Example 8 | Example 9 | Example 10 | Example 12 | Example 13 |
|---|---|---|---|---|---|---|---|---|
| Film |  | modified EVOH | modified EVOH | modified EVOH | modified EVOH | modified EVOH | modified EVOH | modified EVOH |
| Polymer in adhesive |  | E-NR50/NR | E-NR25/NR | E-NR50 | E-NR25 | SBR/Epoxy BR | E-NR50/NR | E-NR25/NR |
| Structure of polymer in adhesive |  | random | random | random | random | random | random | random |
| Weight average molecular weight of polymer |  | 700000/1300000 | 1000000/1300000 | 700000 | 1000000 | 480000/5900 (number ave.) | 700000/1300000 | 1000000/1300000 |
| Tg of modified polymer |  | −24° C. | −47° C. | −24° C. | −47° C. | −60° C. | −24° C. | −47° C. |
| Tm of modified polymer |  | — | — | — | — | — | — | — |
| Solution to dissolve adhesive |  | toluene | toluene | toluene | toluene | toluene | cyclohexane/toluene | cyclohexane/toluene |
| Preparation method |  | cement app. method | cement app. method | cement app. method | cement app. method | cement app. method | cement app. method | cement app. method |
| Adjacent rubber |  | butyl rubber based | butyl rubber based | butyl rubber based | butyl rubber based | butyl rubber based | butyl rubber based | butyl rubber based |
| Peeling resistance | Index | 1.1 | 0.98 | 0.97 | 0.98 | 1.1 | 0.975 | 1.1 |

TABLE 4-continued

|  | Example 6 | Example 7 | Example 8 | Example 9 | Example 10 | Example 12 | Example 13 |
|---|---|---|---|---|---|---|---|
| Tack | 10 | 8 | 20 | 9 | 21 | 10 | 8 |
| Observations after drum running | no crack in adhesion layer | no crack in adhesion layer | no crack in adhesion layer | no crack in adhesion layer | no crack in adhesion layer | no crack in adhesion layer | no crack in adhesion layer |

TABLE 5

|  |  | Example 14 | Example 15 | Example 16 | Example 17 | Example 18 | Example 19 | Example 20 | Example 21 |
|---|---|---|---|---|---|---|---|---|---|
| Film |  | modified EVOH | modified EVOH | modified EVOH | modified EVOH | modified EVOH | modified EVOH | modified EVOH | modified EVOH |
| Polymer in adhesive |  | E-NR50 | E-NR25 | SBR/ Epoxy BR | E-NR50/ NR | E-NR25/ NR | E-NR50 | E-NR25 | SBR/ Epoxy BR |
| Structure of polymer in adhesive |  | random | random | random | random | random | random | random | random |
| Weight average molecular weight of polymer |  | 700000 | 1000000 | 480000/ 5900 (number ave.) | 700000/ 1300000 | 1000000/ 1300000 | 700000 | 1000000 | 480000/ 5900 (number ave.) |
| Tg of modified polymer |  | −24° C. | −47° C. | −60° C. | −24° C. | −47° C. | −24° C. | −47° C. | −60° C. |
| Tm of modified polymer |  | — | — | — | — | — | — | — | — |
| Solution to dissolve adhesive |  | cyclohexane/ toluene | cyclohexane/ toluene | cyclohexane/ toluene | toluene | toluene | toluene | toluene | toluene |
| Preparation method |  | cement app. method | cement app. method | cement app. method | cement app. method | cement app. method | cement app. method | cement app. method | cement app. method |
| Adjacent rubber |  | butyl rubber based | butyl rubber based | butyl rubber based | diene based | diene based | diene based | diene based | diene based |
| Peeling resistance | Index | 1 | 1 | 1 | 1 | 1 | 1 | 1 | 1 |
| Tack |  | 20 | 9 | 20 | 9 | 7 | 20 | 10 | 20 |
| Observations after drum running |  | no crack in adhesion layer | no crack in adhesion layer | no crack in adhesion layer | no crack in adhesion layer | no crack in adhesion layer | no crack in adhesion layer | no crack in adhesion layer | no crack in adhesion layer |

TABLE 6

|  | Example 22 | Example 23 | Example 24 | Example 25 | Example 26 | Example 27 | Example 28 | Example 29 | Example 30 |
|---|---|---|---|---|---|---|---|---|---|
| Film | modified EVOH | modified EVOH | modified EVOH | modified PE/ modified EVOH/ modified PE | TPU/ modified EVOH/ TPU | TPU/ modified EVOH/ TPU | TPU/ modified EVOH/ TPU | Nylon 6 *12 | modified EVOH |
| Polymer in adhesive | E-NR50/ NR | E-NR50/ NR | E-NR50/ NR | E-NR50/ NR | E-NR50/ NR | E-NR50/ Br-IIR | E-NR50/ IR | E-NR50/ NR | IR/ L-IR |
| Structure of polymer in adhesive | random | random | random | random | random | random | random | random | random |
| Weight average molecular weight of polymer | 700000/ 1300000 | 700000/ 1300000 | 700000/ 1300000 | 700000/ 1300000 | 700000/ 1300000 | 700000/ 407000 | 700000/ 1400000 | 700000/ 1300000 | 1400000/ 25000 |
| Tg of modified polymer | −24° C. | −24° C. | −24° C. | −24° C. | −24° C. | −24° C. | −24° C. | −24° C. | −60° C. |
| Tm of modified polymer | — | — | — | — | — | — | — | — | — |

TABLE 6-continued

|  | Example 22 | Example 23 | Example 24 | Example 25 | Example 26 | Example 27 | Example 28 | Example 29 | Example 30 |
|---|---|---|---|---|---|---|---|---|---|
| Solution to dissolve adhesive | toluene | toluene | xylene | xylene | xylene | toluene | toluene | xylene | toluene |
| Preparation method | transfer method | sheeting method | cement app. method | cement app. method | cement app. method | cement app. method | cement app. method | cement app. method | cement app. method |
| Adjacent rubber | butyl rubber based | butyl rubber based | butyl rubber based | butyl rubber based | butyl rubber based | butyl rubber based | diene based | butyl rubber based | butyl rubber based |
| Peeling resistance Index | 1 | 1 | 1 | 1 | 1 | 1.3 | 1.2 | 1.1 | 1.2 |
| Tack | 9 | 10 | 10 | 10 | 9 | 12 | 12 | 10 | 10 |
| Observations after drum running | no crack in adhesion layer | no crack in adhesion layer | no crack in adhesion layer | no crack in adhesion layer | no crack in adhesion layer | no crack in adhesion layer | no crack in adhesion layer | no crack in adhesion layer | no crack in adhesion layer |

*1 "EPOXYPRENE 50" manufactured by Muang Mai Guthrie Public Company Limited
*2 "EPOXYPRENE 25" manufactured by Muang Mai Guthrie Public Company Limited
*3 "Epolead PB3600" manufactured by Daicel Chemical Industries, Ltd.
*4 "Bromobutyl 2244", brominated butyl rubber manufactured by JSR Corporation
*5 "IR2200" manufactured by Nippon Zeon Co., Ltd.
*6 "Asahi # 80" manufactured by Asahi Carbon Co., Ltd.
*7 "PR-SC-400" manufactured by Sumitomo Bakelite Company Limited
*8 N-phenyl-N'-(1,3-dimethyl butyl)-p-phenylene diamine, an antioxidant
*9 "Nocceler CZ-G", N-cyclohexyl-2-benzothiazolyl sulfenamide, a cross-linking accelerator manufactured by Ouchishinko Chemical Industrial Co., Ltd.
*10 "Epofriend AT501" manufactured by Daicel Chemical Industries, Ltd.
*11 "Bondfast 7B" manufactured by Sumitomo Chemical Company, Limited
*12 "Ube Nylon 5033B", Nylon 6 manufactured by Ube Industries, Ltd.
*13 "BR01" manufactured by JSR Corporation
*14 "#1500" manufactured by JSR Corporation As can be seen from Tables 3-6, the laminate of each example has a significantly high peeling resistance as compared with the laminate of Comparative Example 3. In addition, with respect to the laminate of each example, the adhesive composition according to the present invention highly balances tack with peeling resistance, thereby allowing strong bonding between the film and the unvulcanized rubber. Further, as is ascertained by the observations on the adhesive composition layer after drum running, no crack occurs in any Example of the present invention. Thus, it will be readily appreciated that the adhesive composition layer of each example is much stronger than those of Comparative Examples. As such, the adhesive composition of the present invention needs to contain a polymer component which has a glass transition temperature or both a glass transition temperature and a melting point of 40° C. or lower, has a main chain having a random structure, has epoxy groups and has sulfur-crosslinkable sites.

The invention claimed is:

1. A laminate formed by a method for bonding a film to an unvulcanized rubber, comprising: disposing an adhesive composition between the film and the unvulcanized rubber and then vulcanizing the unvulcanized rubber to bond the film to the unvulcanized rubber, wherein
the adhesive composition comprises a polymer component, wherein the polymer component has a glass transition temperature of 40° C. or lower if it does not have a melting point, or both a glass transition temperature and a melting point of 40° C. or lower if it has a melting point, has a main chain having a random structure, has epoxy groups and has sulfur-crosslinkable sites, and further wherein
the polymer component comprises a high molecular weight polymer having a weight average molecular weight of 150000-2000000.

2. A tire using the laminate according to claim 1.

* * * * *